United States Patent
Strasser et al.

(10) Patent No.: US 11,965,074 B2
(45) Date of Patent: Apr. 23, 2024

(54) ANION EXCHANGE MEMBRANE AND METHODS OF MAKING AND USING THE SAME

(71) Applicant: Giner, Inc., Newton, MA (US)

(72) Inventors: Derek J. Strasser, Marlborough, MA (US); Hui Xu, Acton, MA (US); Judith Lattimer, Cambridge, MA (US)

(73) Assignee: GINER, INC., Newton, MA (US)

( * ) Notice: Subject to any disclaimer, the term of this patent is extended or adjusted under 35 U.S.C. 154(b) by 0 days.

(21) Appl. No.: 17/836,733

(22) Filed: Jun. 9, 2022

(65) Prior Publication Data
US 2023/0399477 A1 Dec. 14, 2023

(51) Int. Cl.
*C08J 5/22* (2006.01)
*C08F 226/02* (2006.01)

(52) U.S. Cl.
CPC .......... *C08J 5/2231* (2013.01); *C08F 226/02* (2013.01); *C08J 2339/00* (2013.01)

(58) Field of Classification Search
CPC ..... C08J 5/2231; C08J 2339/00; C08F 226/02
USPC .......................................................... 521/27
See application file for complete search history.

(56) References Cited

U.S. PATENT DOCUMENTS

| | | | | |
|---|---|---|---|---|
| 4,508,603 A | * | 4/1985 | Ukihashi ................ | C08J 5/2237 205/516 |
| 11,745,148 B2 | * | 9/2023 | Knauss .................. | C08J 5/2262 210/500.28 |
| 2016/0228867 A1 | * | 8/2016 | Gao ........................ | B01D 61/44 |
| 2019/0060842 A1 | * | 2/2019 | Knauss ................ | H01M 8/1072 |
| 2021/0032378 A1 | * | 2/2021 | Yandrasits ............. | C08J 5/2243 |

FOREIGN PATENT DOCUMENTS

| | | |
|---|---|---|
| CN | 104672362 A | 6/2015 |
| GB | 1062287 A | 3/1967 |
| GB | 1068459 A | 5/1967 |
| WO | 2019177944 A1 | 9/2019 |

OTHER PUBLICATIONS

Zhu et al., "Poly(olefin)-Based Anion Exchange Membranes Prepared Using Ziegler-Natta Polymerization," Macromolecules, 52:4030-4041 (2019).
Buggy et al., "A Polyethylene-based Triblock Copolymer Anion Exchange Membrane with High Conductivity and Practical Mechanical Properties," ACS Appl. Polym. Mater., 2:1294-1303 (2020).
Zhang et al., "Highly Stable Anion Exchange Membranes Based on Quaternized Polypropylene," Journal of Materials Chemistry A, 3:12284-12296 (2015).
Coates et al., "Catalysts for the Living Insertion Polymerization of Alkenes: Access to New Polyolefin Architectures Using Ziegler-Natta Chemistry," Angew. Chem. Int. Ed., 41:2236-2257 (2002).
Kesti et al., "Homogeneous Ziegler-Natta Polymerization of Functionalized Monomers Catalyzed by Cationic Group IV Metallocenes," J. Am. Chem. Soc., 114:9679-9680 (1992).
Li et al., "Polyethylene-Based Block Copolymers for Anion Exchange Membranes," Macromolecules, 48: 6523-6533 (2015).
Zhang et al., New Polyethylene Based Anion Exchange Membranes (PE-AEMs) with High Ionic Conductivity, Macromolecules, 44: 5937-5946 (2011).
Zhang et al., "Facilitating Anion Transport in Polyolefin-based Anion Exchange Membranes via Bulky Side Chains," ACS Appl. Mater. Interfaces, 8:23321-23330 (2016).
Zhu et al., "Synthesis and properties of quaternized polyolefins with bulky poly(4-phenyl-1-butene) moieties as anion exchange membranes," Journal of Membrane Science, 541: 244-252 (2017).
U.S. Appl. No. 17/743,303, inventors Derek J. Strasser et al., filed May 12, 2022 (available in USPTO's IFW system).

* cited by examiner

*Primary Examiner* — Michael M. Bernshteyn
(74) *Attorney, Agent, or Firm* — KRIEGSMAN & KRIEGSMAN

(57) ABSTRACT

Anion exchange membrane and methods of making and using the same. In one embodiment, the anion exchange membrane may be made by a method that includes a two-step polymerization. In the first step, an α-olefin monomer containing a pendant halide, such as 8-bromo-1-octene, may be polymerized by Ziegler-Natta polymerization to form a first polymer portion, the first polymer portion being a homopolymer. In the second step, the polymerization is charged with a non-functionalized α-olefin monomer, such as ethylene, thereby forming a second polymer portion, the second polymer being a copolymer made up predominantly of the non-functionalized olefin monomer. If desired, a small amount of an α-olefin monomer containing a crosslinking functionality may be included in the first and/or second steps. Following the two-step polymerization, the polymer is fabricated into a thin film. Thereafter, the thin film may be functionalized by replacing the pendant halides with pendant cations.

11 Claims, 9 Drawing Sheets

ANION EXCHANGE MEMBRANE AND METHODS OF MAKING AND USING THE SAME

FEDERALLY SPONSORED RESEARCH OR DEVELOPMENT

This invention was made with government support under DE-EE0009421 awarded by the Department of Energy, Energy Efficiency, and Renewable Energy (DOE EERE) and under DE-SC0020576, awarded by the Department of Energy, Small Business Innovation Research and Small Business Technology Transfer (SBIR/STTR) Programs Office. The government has certain rights in the invention.

BACKGROUND OF THE INVENTION

The present invention relates generally to solid polymer electrolyte membranes and relates more particularly to anion exchange membranes and to methods of making and using the same.

Electrochemical devices of the type that include a solid polymer electrolyte membrane are well-known, examples of such devices including fuel cells, electrolyzers, and the like. One well-known type of solid polymer electrolyte membrane is commonly referred to in the art as a proton exchange membrane. Proton exchange membranes typically consist of a homogeneous perfluorosulfonic acid (PFSA) polymer, which may be formed by the copolymerization of tetrafluoroethylene and perfluorovinylether sulfonic acid. Proton exchange membranes are designed to conduct protons and to be poor conductors of electrons while having low permeability to gases like hydrogen and oxygen.

Another well-known type of solid polymer electrolyte membrane is commonly referred to in the art as an anion exchange membrane (AEM). Typically, anion exchange membranes comprise functionalized rigid polymers that include an aromatic backbone. Like proton exchange membranes, anion exchange membranes are poor conductors of electrons and have low permeability to gases like hydrogen and oxygen. On the other hand, whereas proton exchange membranes are designed to conduct protons, anion exchange membranes are designed to conduct anions, such as hydroxide ions.

Typically, in an electrochemical device of the type that comprises a solid polymer electrolyte membrane, a suitable catalyst coating is positioned against each of the opposing surfaces of the solid polymer electrolyte membrane, the catalyst coatings serving as the anode and the cathode of the electrochemical device. In some cases, this is accomplished by applying the catalyst coatings directly onto the opposing surfaces of the solid polymer electrolyte membrane. Alternatively, in some cases, this is accomplished by applying the catalyst coatings onto suitable substrates like gas diffusion media (e.g., carbon paper) and then positioning the coated substrates so that the catalyst coatings are disposed against the opposing surfaces of the solid polymer electrolyte membrane. In either case, whether the catalyst coatings are applied directly onto the solid polymer electrolyte membrane or whether the catalyst coatings are applied to a substrate, which is then positioned against the solid polymer electrolyte membrane, the resulting multi-layered structure is commonly referred to as a membrane electrode assembly (MEA). An electrochemical device may have a single such membrane electrode assembly or may include a plurality of membrane electrode assemblies, which may be arranged in series.

Where, for example, the solid polymer electrolyte membrane is to be used in a fuel cell, the catalyst coating on one surface of the solid polymer electrolyte membrane may be an oxygen reduction reaction (ORR) catalyst, and the catalyst coating on the opposing surface of the solid polymer electrolyte membrane may be a hydrogen oxidation reaction (HOR) catalyst. By contrast, where the solid polymer electrolyte membrane is to be used in an electrolyzer, the catalyst coating on one surface of the solid polymer electrolyte membrane may be an oxygen evolution reaction (OER) catalyst, and the catalyst coating on the opposing surface of the solid polymer electrolyte membrane may be a hydrogen evolution reaction (HER) catalyst.

As can readily be appreciated, the manner in which a membrane electrode assembly is fabricated may have a significant impact on its performance and durability and, correspondingly, may affect the performance and durability of an electrochemical device that includes such a membrane electrode assembly. For example, high-performance membrane electrode assemblies typically exhibit excellent contact between the membrane and the catalyst coatings, resulting in high ionic conductivity and decreased interfacial resistance. Therefore, fabrication techniques that result in good contact between the membrane and the catalyst coatings are highly coveted.

Where the solid polymer electrolyte membrane is a proton exchange membrane, such contact between the membrane and the catalyst coatings is typically achieved, after the catalyst coatings have been directly applied to the membrane or after the catalyst coatings have been directly applied to a substrate that is then positioned against the membrane, by a post-treatment step that involves hot-pressing the catalyst coatings against the membrane at an elevated temperature (e.g., 300° F.-360° F.) that is above the glass transition temperature ($T_g$) of the membrane, causing the catalyst coatings to fuse to and/or to become partially embedded in the membrane. Such processing is made possible by the fact that proton exchange membranes typically exhibit thermal transitions at temperatures that are significantly lower than their thermal degradation reaction temperatures. Consequently, the aforementioned hot-pressing technique can be used to slightly soften the membrane, thereby causing the catalyst layers to bond to the softened membrane, without causing degradation of the membrane.

By contrast, the thermal characteristics of many anion exchange membranes are such that an onset of thermal degradation is often exhibited at a temperature that is lower than the glass transition temperature ($T_g$) of the membrane. As a result, the same type of hot-pressing post-treatment technique that is used to obtain good contact between a proton exchange membrane and its catalyst coatings cannot typically be used to obtain good contact between an anion exchange membrane and its catalyst coatings since the anion exchange membrane will start to degrade before it softens sufficiently for the catalyst coatings to fuse thereto. Because of this problem, efforts have been undertaken to design an anion exchange membrane that can undergo the type of hot-pressing post-treatment technique discussed above without suffering from degradation. Some of these efforts have involved attempts to replace the aromatic backbone typically found in anion exchange membranes with an aliphatic backbone, such as a polyolefin backbone. However, to date, such efforts have been less than optimal due, in part, to the difficulty of functionalizing such backbones.

Documents that may be of interest may include the following, all of which are incorporated herein by reference: U.S. Patent Application Publication No. US 2021/0032378

A1, inventors Yandrasits et al., published Feb. 4, 2021; PCT International Publication No. WO 2019/177944 A1, published Sep. 19, 2019; UK Patent No. GB 1,062,287 A, published Mar. 22, 1967; UK Patent No. GB 1,068,459 A, published May 10, 1967; Chinese Patent Application Publication No. CN 104672362 A, published Jun. 3, 2015; Zhu et al., "Poly(olefin)-Based Anion Exchange Membranes Prepared Using Ziegler-Natta Polymerization," *Macromolecules,* 52:4030-4041 (2019); Buggy et al., "A Polyethylene-based Triblock Copolymer Anion Exchange Membrane with High Conductivity and Practical Mechanical Properties," *ACS Appl. Polym. Mater.,* 2:1294-1303 (2020); Zhang et al., "Highly Stable Anion Exchange Membranes Based on Quaternized Polypropylene," *Journal of Materials Chemistry A,* 3:12284-12296 (2015); Coates et al., "Catalysts for the Living Insertion Polymerization of Alkenes: Access to New Polyolefin Architectures Using Ziegler-Natta Chemistry," *Angew. Chem. Int. Ed.,* 41:2236-2257 (2002); Kesti et al., "Homogeneous Ziegler-Natta Polymerization of Functionalized Monomers Catalyzed by Cationic Group IV Metallocenes," *J. Am. Chem. Soc.,* 114:9679-9680 (1992); Li et al., "Polyethylene-Based Block Copolymers for Anion Exchange Membranes," *Macromolecules,* 48: 6523-6533 (2015); Zhang et al., "New Polyethylene Based Anion Exchange Membranes (PE-AEMs) with High Ionic Conductivity, *Macromolecules,* 44: 5937-5946 (2011); Zhang et al., "Facilitating Anion Transport in Polyolefin-based Anion Exchange Membranes via Bulky Side Chains," *ACS Appl. Mater. Interfaces,* 8:23321-23330 (2016); and Zhu et al., "Synthesis and properties of quaternized polyolefins with bulky poly(4-phenyl-1-butene) moieties as anion exchange membranes," *Journal of Membrane Science,* 541: 244-252 (2017).

SUMMARY OF THE INVENTION

It is an object of the present invention to provide a novel anion exchange membrane.

It is another object of the present invention to provide an anion exchange membrane as described above that overcomes at least some of the shortcomings associated with existing anion exchange membranes.

Therefore, according to one aspect of the invention, there is provided an anion exchange membrane, the anion exchange membrane comprising a copolymer, the copolymer comprising (i) a first polymer portion, the first polymer portion comprising a homopolymer block of first monomer units, each of the first monomer units comprising an α-olefin monomer unit containing a pendant cationic group; and (ii) a second polymer portion, the second polymer portion being a copolymer comprising the first monomer units and second monomer units, each of the second monomer units comprising a non-functionalized α-olefin monomer unit.

In a more detailed feature of the invention, the homopolymer block may comprise at least 50 first monomer units.

In a more detailed feature of the invention, the pendant cationic group may comprise an ammonium ion group.

In a more detailed feature of the invention, the ammonium ion group may be selected from the group consisting of trimethylammonium, N-methyl-piperidinium, N-methyl-pyrrolidinium, 1-methylimidazolium, and 1,2-methylimidazolium.

In a more detailed feature of the invention, the ammonium ion group may be trimethylammonium.

In a more detailed feature of the invention, each of the first monomer units may comprise an α-olefin containing 8 to 11 carbon atoms.

In a more detailed feature of the invention, each of the first monomer units may comprise an α-olefin containing 8 carbon atoms.

In a more detailed feature of the invention, each of the second monomer units may be a non-functionalized α-olefin monomer unit selected from the group consisting of an ethylene monomer unit, a propylene monomer unit, a butylene monomer unit, and a 3-methyl-1-pentene monomer unit.

In a more detailed feature of the invention, each of the second monomer units may be an ethylene monomer unit.

In a more detailed feature of the invention, the homopolymer block may comprise at least 50 first monomer units, each of the first monomer units may be an α-octene monomer unit containing a pendant ammonium ion group, and each of the second monomer units may be an ethylene monomer unit.

In a more detailed feature of the invention, the copolymer may be poly(ethylene-co-8-(N,N,N-trimethylammonium)-1-octene).

In a more detailed feature of the invention, the second polymer may be a copolymer.

In a more detailed feature of the invention, the second polymer may be a terpolymer.

In a more detailed feature of the invention, the second polymer may further comprise third monomer units, and at least some of the third monomer units may comprise an α-olefin monomer unit containing a pendant crosslinker.

In a more detailed feature of the invention, the first polymer portion may consist of the homopolymer block of first monomer units.

In a more detailed feature of the invention, the first polymer portion may further comprise third monomer units, and at least some of the third monomer units may comprise an α-olefin monomer unit containing a pendant crosslinker.

In a more detailed feature of the invention, each of the third monomer units may comprise a divinylbenzene monomer unit.

In a more detailed feature of the invention, the copolymer may be poly(ethylene-co-8-(N,N,N-trim ethylammonium)-1-octene-co-divinylbenzene).

According to another aspect of the invention, there is provided an anion exchange membrane, the anion exchange membrane comprising a terpolymer, the terpolymer comprising first monomer units, second monomer units, and third monomer units, wherein each of the first monomer units comprises an α-olefin monomer unit containing a pendant cationic group, wherein each of the second monomer units comprises a non-functionalized α-olefin monomer unit, and wherein each of the third monomer units comprises an α-olefin monomer unit containing a pendant crosslinker.

In a more detailed feature of the invention, the pendant cationic group may be an ammonium ion group.

In a more detailed feature of the invention, the ammonium ion group may be selected from the group consisting of trimethylammonium, N-methyl-piperidinium, N-methyl-pyrrolidinium, 1-methylimidazolium, and 1,2-methylimidazolium.

In a more detailed feature of the invention, the ammonium ion group may be trimethylammonium.

In a more detailed feature of the invention, each of the first monomer units may comprise an α-olefin containing 8 to 11 carbon atoms.

In a more detailed feature of the invention, each of the first monomer units may comprise an α-olefin containing 8 carbon atoms.

In a more detailed feature of the invention, each of the second monomer units may be selected from the group consisting of an ethylene monomer unit, a propylene monomer unit, a butylene monomer unit, and a 3-methyl-1-pentene monomer unit.

In a more detailed feature of the invention, each of the second monomer units may be an ethylene monomer unit.

In a more detailed feature of the invention, each of the third monomer units may comprise divinylbenzene.

According to yet another aspect of the invention, there is provided an anion exchange membrane, the anion exchange membrane comprising a copolymer, the copolymer comprising first monomer units and second monomer units, wherein each of the first monomer units comprises an α-octene monomer unit containing a pendant ammonium group, and wherein each of the second monomer units comprises an ethylene monomer unit.

The present invention is also directed at methods of making and using an anion exchange membrane.

According to one aspect, there is provided a method for fabricating an anion exchange membrane, the method comprising the steps of (a) preparing a copolymer, wherein said preparing step comprises (i) in a first polymerization step, polymerizing a first monomer, wherein the first monomer is an α-olefin monomer comprising a pendant halide, whereby a first polymer portion is formed, the first polymer portion being a homopolymer portion; (ii) then, in a second polymerization step, polymerizing a mixture comprising the first monomer and a second monomer, the second monomer comprising a non-functionalized α-olefin monomer, whereby a second polymer portion is formed after the first polymer portion, the second polymer portion being a copolymer; (c) processing the copolymer to form a thin film membrane; and (d) functionalizing the thin film membrane by replacing the pendant halide with a pendant cationic group.

In a more detailed feature of the invention, the homopolymer portion may comprise at least 50 first monomer units.

In a more detailed feature of the invention, the first monomer may be a w-halo-α-olefin containing 8 to 11 carbon atoms, and the halogen may be chlorine or bromine.

In a more detailed feature of the invention, the first monomer may be selected from the group consisting of 8-bromo-1-octene, 8-chloro-1-octene, 11-bromo-1-undecene, and 11-chloro-1-undecene.

In a more detailed feature of the invention, the first monomer may be 8-bromo-1-octene.

In a more detailed feature of the invention, the second monomer may be selected from the group consisting of ethylene, propylene, butylene, and 3-methyl-1-pentene.

In a more detailed feature of the invention, the second monomer may be ethylene.

In a more detailed feature of the invention, each of the first polymerization step and the second polymerization may be a Ziegler-Natta polymerization.

In a more detailed feature of the invention, the mixture of the second polymerization step may further comprise a third monomer, and the third monomer may comprise an α-olefin monomer with a pendant crosslinker.

In a more detailed feature of the invention, the third monomer may comprise divinylbenzene.

In a more detailed feature of the invention, the functionalizing step may comprise treating the thin film membrane with an aqueous amine solution.

In a more detailed feature of the invention, the pendant cationic group may be selected from the group consisting of trimethylammonium, N-methyl-piperidinium, N-methyl-pyrrolidinium, 1-methylimidazolium, 1,2-methylimidazolium, and combinations thereof.

The present invention is also directed at an anion exchange membrane that is made by the method described above, as well as being directed at a membrane electrode assembly that comprises an anion exchange membrane as described above and an electrochemical device that comprises a membrane electrode assembly as described above.

For purposes of the present specification and claims, various relational terms like "top," "bottom," "proximal," "distal," "upper," "lower," "front," and "rear" may be used to describe the present invention when said invention is positioned in or viewed from a given orientation. It is to be understood that, by altering the orientation of the invention, certain relational terms may need to be adjusted accordingly.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. These drawings are not necessarily drawn to scale, and certain components may have undersized and/or oversized dimensions for purposes of explication or may omit certain features for purposes of clarity. In the drawings wherein like reference numeral represent like parts.

DETAILED DESCRIPTION OF THE INVENTION

Figure 1:
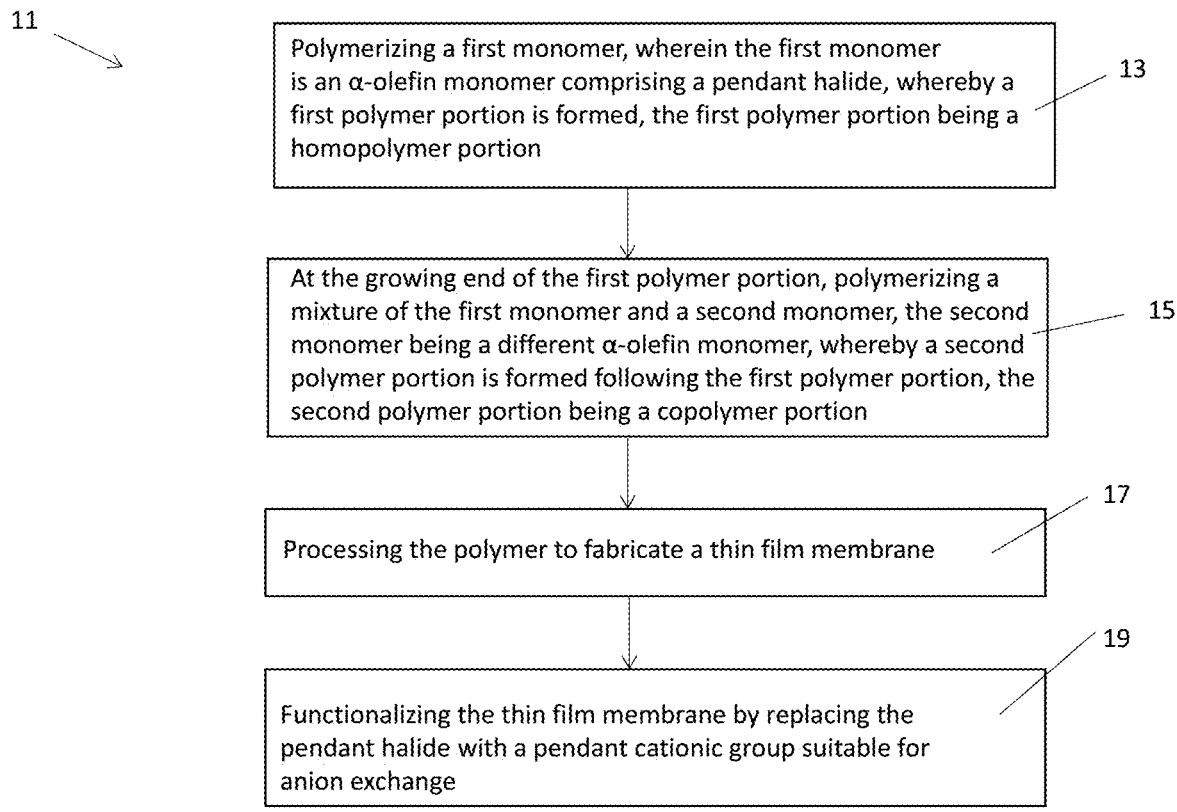
FIG. 1 is a flowchart showing a first embodiment of a method for fabricating an anion exchange membrane according to the present invention.

As noted above, one common difficulty in fabricating a membrane electrode assembly that comprises an anion exchange membrane is that, for many such anion exchange membranes, the anion exchange membrane begins to experience thermal degradation at a temperature that is lower than the glass transition temperature ($T_g$) of the membrane. Consequently, such anion exchange membranes are typically not amenable to having catalyst coatings hot-pressed thereonto. As a result, in many cases, membrane electrode assemblies that comprise anion exchange membranes do not exhibit the same type of close contact between the membrane and the catalyst coatings that is typically exhibited by membrane electrode assemblies that are made by a process that includes such hot-pressing.

Against this backdrop, an objective of the present invention is to provide a polymer suitable for use as an anion exchange membrane that does not undergo significant thermal degradation at temperatures typically experienced during such hot-pressing.

According to one aspect of the invention, the foregoing objective may be achieved, at least in part, by replacing the aromatic backbone typically found in anion exchange membrane polymers with an aliphatic backbone, preferably a polyolefin backbone, and by providing appropriate functionalities in side chains to the aliphatic backbone. More specifically, according to one embodiment of the invention, the anion exchange membrane may comprise a polymer that is formed by copolymerizing two different types of α-olefin monomers. For example, in a first embodiment, the polymer may be a copolymer and may be formed by copolymerizing two α-olefin monomers, one of which may comprise a pendant halide. Preferably, an end portion of the copolymer contains a block of monomer units each comprising the pendant halide. As another example, in a second embodiment, the polymer may be a terpolymer and may be formed by copolymerizing three different types of α-olefin monomers, one of which may comprise a pendant halide and another of which may comprise a cross-linking functionality. Preferably, an end portion of the terpolymer contains a block of monomer units each comprising the pendant halide, or contains a random or statistical mixture of monomer units comprising the pendant halide and the cross-linking functionality.

Another aspect of the present invention relates to a method of fabricating the above-described polymer. For example, in one embodiment, the polymer may be a copolymer, and the method for making the copolymer may comprise a two-step polymerization process. For example, in a first step, the method may comprise polymerizing an α-olefin monomer comprising a pendant halide, whereby a first polymer portion may be formed, the first polymer portion being a homopolymer portion. Then, in a second step, a mixture of α-olefin monomers may be polymerized, the mixture of α-olefin monomers comprising an α-olefin monomer comprising a pendant halide and an α-olefin monomer lacking a pendant halide, whereby a second polymer portion may be formed at the growing end of the first polymer portion, the second polymer portion being a copolymer portion. The second polymer portion may be a random copolymer portion, with the two types of monomer units randomly distributed throughout. If the concentration of the α-olefin monomer lacking the pendant halide is kept fairly constant throughout the copolymerization step whereas the concentration of the α-olefin monomer comprising the pendant halide decreases as it is consumed during the copolymerization step, representation in the second polymer portion of the α-olefin monomer lacking the pendant halide may increase as the second polymer portion grows.

As another example, in a second embodiment, the polymer may be a terpolymer, and the method may comprise a two-step polymerization process. In a first step, the method may comprise polymerizing an α-olefin monomer comprising a pendant halide, whereby a first polymer portion may be formed, the first polymer portion being a homopolymer portion. Then, in a second step, a mixture of α-olefin monomers may be polymerized, the mixture of α-olefin monomers comprising an α-olefin monomer comprising a pendant halide, an α-olefin monomer comprising a cross-linking functionality, and an α-olefin monomer lacking such functionalities, whereby a second polymer portion may be formed at the growing end of the first polymer portion, the second polymer portion being a terpolymer portion. The second polymer portion may be a random terpolymer portion, with the three types of monomer units randomly distributed throughout. If the concentration of the α-olefin monomer lacking the functionalities of the other two α-olefin monomers is kept fairly constant throughout the copolymerization step whereas the concentrations of the α-olefin monomers comprising the pendant halide and the cross-linking functionality decrease as they are consumed during the copolymerization step, representation in the second polymer portion of the α-olefin monomer lacking the aforementioned functionalities may increase as the second polymer portion grows.

As still another example, in a third embodiment, the copolymer may be a terpolymer, and the method may comprise a two-step polymerization process. However, in contrast with the method of the second embodiment, the α-olefin monomer comprising the cross-linking functionality may be included in the first polymerization step, as opposed to the second polymerization step, or may be included in both the first polymerization step and the second polymerization step.

Regardless of which of the various polymerization processes described above may be employed, once a polymer has been formed, the polymer may be processed to form a thin film membrane and then the membrane may be functionalized, for example, by replacing the pendant halide with a pendant cationic group suitable for anion exchange.

Referring now to FIG. 1, there is shown a flowchart depicting a first embodiment of a method for fabricating an anion exchange membrane according to the present invention, the method being represented generally by reference numeral 11. Details of method 11 that are discussed elsewhere in this application or that are not critical to an understanding of the invention may be omitted from FIG. 1 and/or from the accompanying description herein or may be shown in FIG. 1 and/or described herein in a simplified manner.

Method 11 may begin with a step 13 of polymerizing a first monomer to form a first polymer portion, the first polymer portion being a homopolymer portion. The first monomer may be a functional monomer and, more specifically, may be an α-olefin monomer with a pendant halide, such as a co-halo-α-olefin containing 8 to 11 carbon atoms in which the halogen is chlorine or bromine. Examples of the first monomer may include, but are not limited to, 8-bromo-1-octene, 8-chloro-1-octene, 11-bromo-1-undecene, and 11-chloro-1-undecene, all of which are liquids at room temperature and 1 atm.

The polymerization of the first monomer may be a Ziegler-Natta polymerization that is catalyzed using a heterogeneous Ziegler-Natta catalyst system, such as a combination of aluminum reduced titanium chloride and diethyl aluminum chloride or a combination of aluminum reduced titanium chloride and diisobutyl aluminum chloride. More specifically, polymerization of the first monomer may be conducted under air-free and moisture-free conditions in the presence of toluene, aluminum reduced titanium chloride, and diethylaluminum chloride (or diisobutyl aluminum chloride). For example, in one embodiment, polymerization may be conducted, under air-free and moisture-free conditions, by charging aluminum reduced titanium chloride, 8-bromo-1-octene, toluene, and diethylaluminum chloride into a glass pressure reactor (e.g., 500 mL reactor) with overhead stirring for an extended period of time (e.g., up to 60 minutes or longer). The concentration of 8-bromo-1-octene with respect to toluene may be about 2M, the ratio of 8-bromo-1-octene to titanium may be about 200:1, and the ratio of aluminum to titanium may be about 4:1. More specifically, the reactor may be charged with 10 mL of 8-bromo-1-octene, 30 mL toluene, 60 mg $TiCl_3$ and 1.2 mL of 1 M diethylaluminum chloride solution (in heptanes). In a preferred embodiment, the foregoing polymerization may be conducted at room temperature for about 1 hour. The resulting homopolymer portion may have a molecular weight of about 10,000-15,000 Da or greater and may include about 50 monomer units or more.

Method 11 may then continue with a step 15 of polymerizing a mixture of the first monomer and a second monomer at the growing end of the first polymer portion, the second monomer being different from the first monomer, whereby a second polymer portion is formed following the first polymer portion, the second polymer portion being a copolymer portion. The second monomer may be an α-olefin monomer lacking a pendant halide and may be, for example, a gaseous α-olefin monomer selected from the group consisting of ethylene, propylene, butylene, and 3-methyl-1-pentene. In one embodiment, the polymerization of the first and second monomers may be performed by charging the reactor in which the first polymerization reaction occurs with the second monomer and proceeding by Ziegler-Natta polymerization. For example, the reactor may be charged with 20 psi ethylene. As can be appreciated, if the second monomer is maintained at a constant pressure during the copolymerization step, its concentration will be kept constant throughout the copolymerization step. Consequently, because the concentration of the monomer comprising the pendant halide will decrease as it is consumed during the copolymerization step, the representation of the second monomer in the second polymer portion is likely to increase as the second polymer portion grows. By contrast, if the second monomer is not maintained at a constant pressure during the copolymerization step, its representation in the second polymer portion is not likely to increase relative to the first monomer as the second polymer portion grows. Nevertheless, in either case, the concentration of the second monomer is preferably much greater than the concentration of the first monomer during the second polymerization step; thus, the second polymer portion tends to be predominantly made up of second monomer units.

A schematic representation of the copolymerization of 8-bromo-1-octene (serving as the first monomer) and ethylene (serving as the second monomer) to form the second polymer portion is provided below.

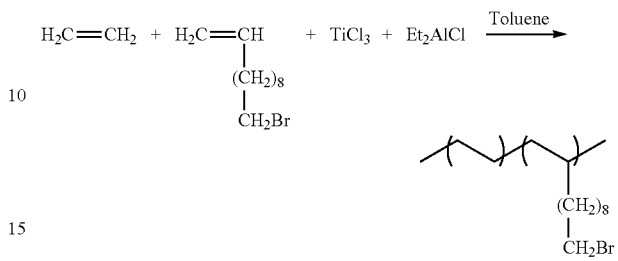

It should be noted that the frequency with which the 8-bromo-1-octene and ethylene monomer units appear in the second polymer portion may be affected by the relative proportions of the two monomers in the reactor.

The copolymerization of the first and second monomers to form the second polymer portion may last for an extended period of time (e.g., up to about 60 minutes or longer). Preferably, said copolymerization may last for about an hour; thereafter, the resulting polymer may be quenched, for example, with a small amount (e.g., about 2-3 mL) of acidic methanol. After quenching, the polymer may be coagulated, for example, in an excess (e.g., 10-fold excess) of methanol. Thereafter, the polymer may be filtered, then washed, for example, with methanol, and then dried, for example, at 60° C. under vacuum, with a recovered mass of 1.6 g.

As can be appreciated, the polymer formed in the above manner begins with a block of functionalized monomer units (e.g., monomer units containing a pendant halide) and then continues with a mixture of functionalized monomer units and non-functionalized monomer units. Depending on the relative proportions of functionalized and non-functionalized monomers used in the second polymerization step, the second polymer portion may be predominantly made up of non-functionalized monomer units, with a smattering of functionalized monomer units randomly dispersed therein. Moreover, the frequency of functionalized monomer units may decrease as the second polymer portion grows if the concentration of non-functionalized monomer is held constant (e.g., by maintaining a constant pressure of the non-functionalized monomer) while the concentration of functionalized monomer decreases as it is consumed. Functionalized monomer units may constitute as little as about 10-15% or as much as about 50% of the composition of the entire polymer (including both the first polymer portion and the second polymer portion). Too much of the functionalized monomer may be undesirable as the resulting anion exchange membrane will take up too much water; moreover, too much of the functional monomer may lead to an anion exchange membrane whose mechanical properties may be less than optimal.

Method 11 may then continue with a step 17 of processing the foregoing polymer to form a thin film membrane. Such processing may involve pressing the dry polymer, for example, between two sheets of glass fiber reinforced TEFLON™ polytetrafluoroethylene that are, in turn, positioned between two stainless steel plates. Such pressing may be with a force of, for example, approximately 24,000 lbs., and the result of such pressing may be a polymer disk. The foregoing polymer disk may then be calendered, for example, at room temperature to a thin film having a thickness of, for example, about 100 µm. From this thin film, one or more membranes may be cut, and the remainder may be reprocessed. The cut films may then be hot-pressed, for example, at 160° C. for 10 minutes, followed by baking, for example, under vacuum at 220° C. for 2 hours.

Method 11 may then continue with a step 19 of functionalizing the thin film membrane by replacing the pendant halide with a pendant cationic group suitable for anion exchange. The pendant cationic group may be, for example, an ammonium ion, and the replacement of the pendant halide with the ammonium ion may be accomplished, for example, by a Menshutkin reaction by soaking the thin film in an amine solution. Examples of suitable ammonium ions may include, but are not limited to, trimethylammonium, N-methyl-piperidinium, N-methyl-pyrrolidinium, 1-methyl-imidazolium, 1,2-methylimidazolium, and combinations thereof. After such soaking, the films may be rinsed, for example, in deionized water, and then may be dried. The resulting product is suitable for use as an anion exchange membrane.

In a preferred embodiment, step 19 may comprise soaking in approximately 50% aqueous trimethylamine solution at 50° C. for about 18 hours and then, after soaking, rinsing the films in deionized water, followed by drying under vacuum at 60° C.

A schematic representation of the functionalization of the second polymer portion of the membrane is provided below.

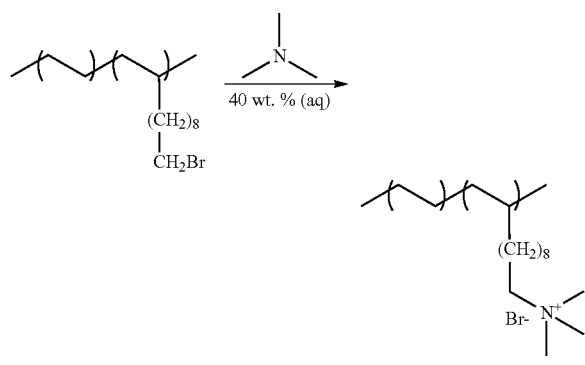

Figure 2:
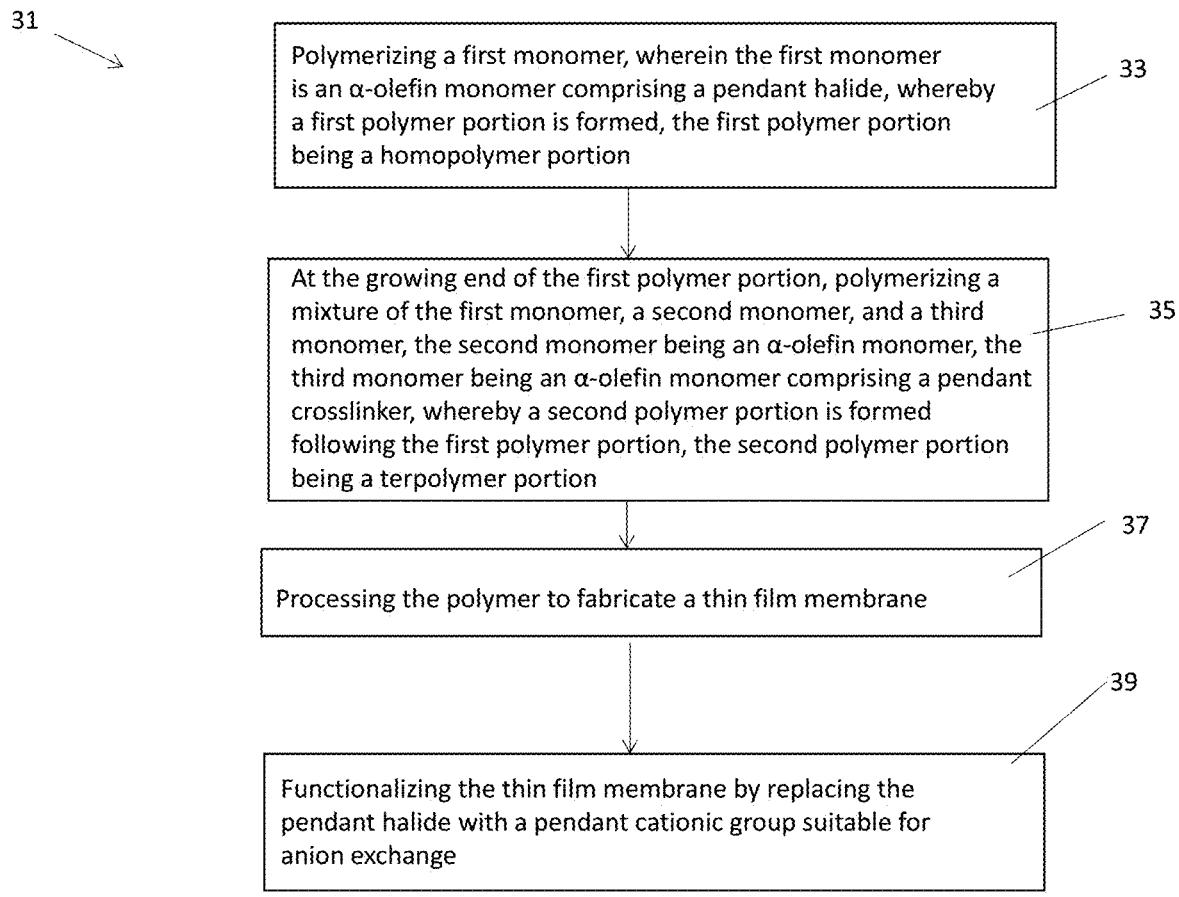
FIG. 2 is a flowchart showing a second embodiment of a method for fabricating an anion exchange membrane according to the present invention.

Referring now to FIG. 2, there is shown a flowchart depicting a second embodiment of a method for fabricating an anion exchange membrane according to the present invention, the method being represented generally by reference numeral 31. Details of method 31 that are discussed elsewhere in this application or that are not critical to an understanding of the invention may be omitted from FIG. 2 and/or from the accompanying description herein or may be shown in FIG. 2 and/or described herein in a simplified manner.

Method 31 may be similar in many respects to method 11. For example, method 31 may begin with a step 33, which may be similar to or identical to step 13 of method 11. Accordingly, step 33 may comprise polymerizing a first monomer to form a first polymer portion, the first polymer portion being a homopolymer portion. The first monomer may be a functional monomer and, more specifically, may be an α-olefin monomer with a pendant halide, such as a ω-halo-α-olefin containing 8 to 11 carbon atoms in which the halogen is chlorine or bromine. Examples of the first monomer may include, but are not limited to, 8-bromo-1-octene, 8-chloro-1-octene, 11-bromo-1-undecene, and 11-chloro-1-undecene, all of which are liquids at room temperature and 1 atm. The resulting homopolymer portion may have a molecular weight of about 10,000-15,000 Da or greater and may include about 50 monomer units or more.

Method 31 may then continue with a step 35. Step 35 may be similar in certain respects to step 15 of method 11; however, whereas step 15 of method 11 may comprise polymerizing a mixture of the first monomer and a second monomer at the growing end of the first polymer portion, step 35 may instead comprise polymerizing a mixture of the first monomer, a second monomer, and a third monomer at the growing end of the first polymer portion, whereby a second polymer portion is formed following the first polymer portion, the second polymer portion being a terpolymer portion. The second monomer may be identical to the second monomer of method 11 and may be an α-olefin monomer lacking a pendant halide, such as a gaseous olefin monomer selected from the group consisting of ethylene, propylene, butylene, and 3-methyl-1-pentene. The third monomer may be an α-olefin monomer that comprises a crosslinking functionality. An example of such a monomer may include, but is not limited to, divinylbenzene. In one embodiment, the polymerization of the first, second and third monomers may be performed by charging the reactor in which the first polymerization reaction occurs with the second and third monomers. For example, the reactor may be charged with divinylbenzene (390 mg or 5 mol % of the first monomer), additional toluene (30 mL), and 20 psi ethylene. The additional toluene may double the initial reaction volume.

As can be appreciated, if the second monomer is maintained at a constant pressure during the copolymerization step, its concentration will be kept constant throughout the copolymerization step. Consequently, because the concentrations of the first and third monomers will decrease as they are consumed during the copolymerization step, the representation of the second monomer in the second polymer portion is likely to increase as the second polymer portion grows. By contrast, if the second monomer is not maintained at a constant pressure during the copolymerization step, its representation in the second polymer portion is not likely to increase relative to the first and third monomers as the second polymer portion grows.

Figure 3:
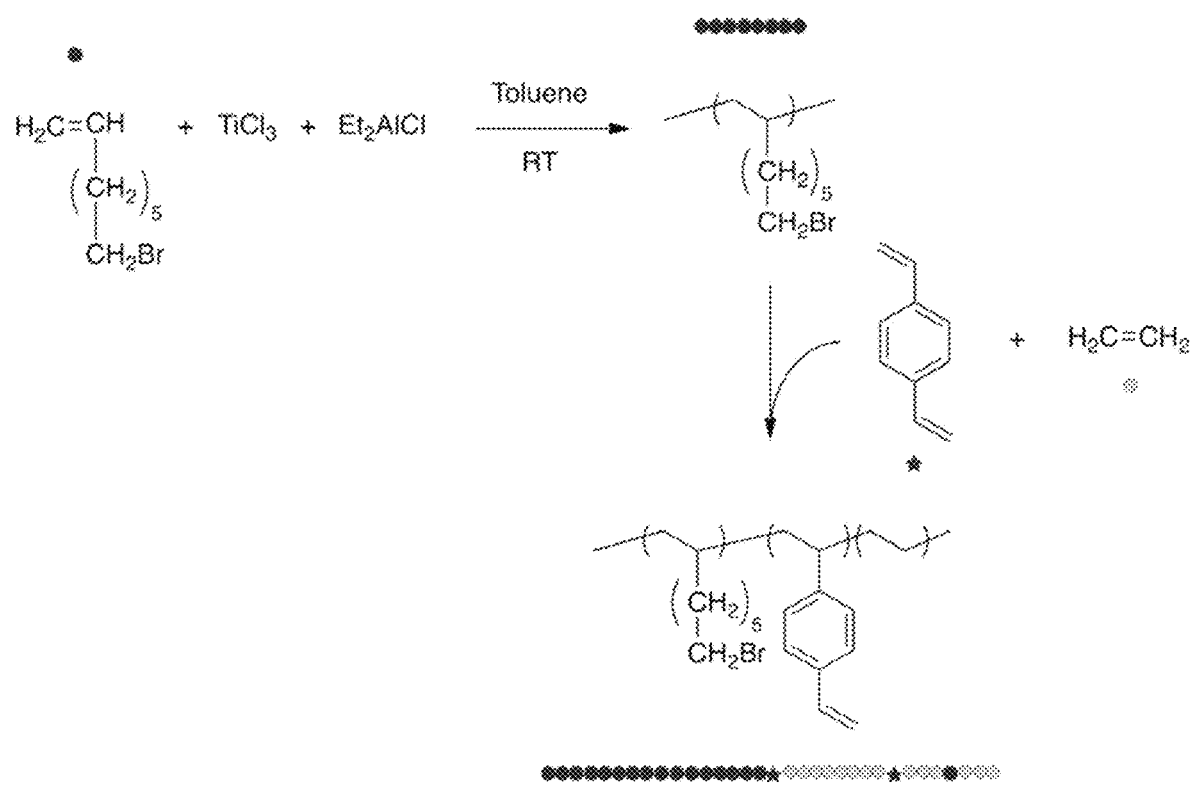
FIG. 3 is a schematic representation of the polymerization process shown in FIG. 2.

A schematic representation of the terpolymerization of 8-bromo-1-octene (serving as the first monomer), ethylene (serving as the second monomer), and divinylbenzene (serving as the third monomer) to form the second polymer portion is shown in FIG. 3.

It should be note that the frequency with which the first, second, and third monomer units appear in the second polymer portion may be affected by the relative proportions of the three monomers in the reactor.

The copolymerization of the first, second and third monomers to form the second polymer portion may last for an extended period of time (e.g., up to about 60 minutes or longer). Preferably, said copolymerization may last for about an hour; thereafter, the resulting polymer may be quenched, for example, with a small amount (e.g., about 2-3 mL) of acidic methanol. After quenching, the polymer may be coagulated, for example, in an excess (e.g., 10-fold excess) of methanol. Thereafter, the polymer may be filtered, washed, for example, with methanol, and then dried, for example, at 60° C. under vacuum, with a recovered mass of ~2.0 g.

Monomer units corresponding to the first monomer (e.g., the olefin with the pendant halide) may constitute about 10-25% of the resulting polymer, and monomer units corresponding to the third monomer (e.g., the olefin with the pendant crosslinker) may constitute 3-10% of the resulting polymer, with monomer units corresponding to the second monomer (e.g., the olefin having neither a pendant halide nor a pendant crosslinker) constituting the balance of the resulting polymer. In one embodiment, the polymer may contain about 71% of ethylene monomer units, about 23% of 8-bromo-1-octene units, and about 5% of divinylbenzene monomer units.

Method 31 may further comprise steps 37 and 39, which may be similar or identical to steps 17 and 19, respectively, of method 11. The baking that occurs as part of step 37 may cause the crosslinking functionality of the third monomer to crosslink. The product formed by method 31 is suitable for use as an anion exchange membrane.

Figure 4:
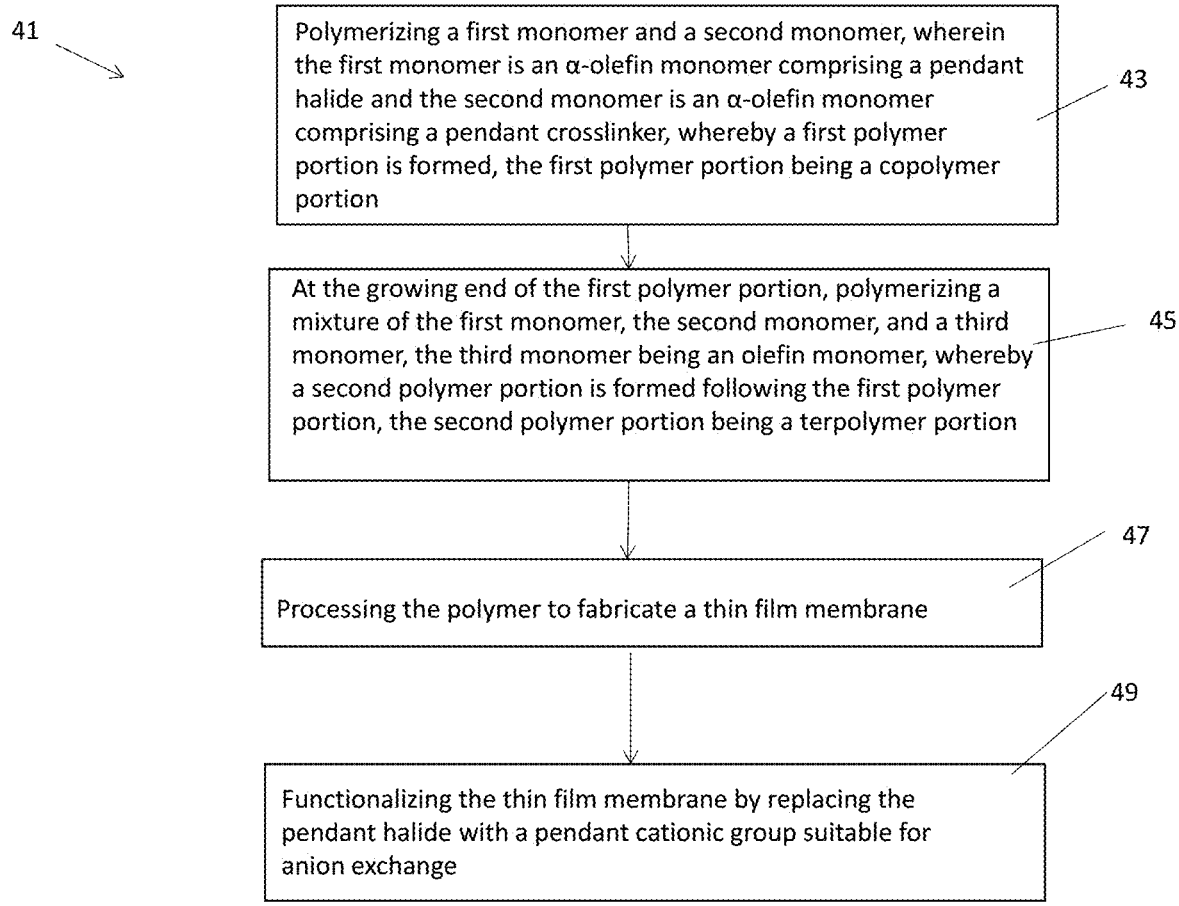
FIG. 4 is a flowchart showing a third embodiment of a method for fabricating an anion exchange membrane according to the present invention.

Referring now to FIG. 4, there is shown a flowchart depicting a third embodiment of a method for fabricating an anion exchange membrane according to the present invention, the method being represented generally by reference numeral 41. Details of method 41 that are discussed elsewhere in this application or that are not critical to an understanding of the invention may be omitted from FIG. 4 and/or from the accompanying description herein or may be shown in FIG. 4 and/or described herein in a simplified manner.

Method 41, which may be similar in many respects to method 31, may include steps 43, 45, 47 and 49. Step 43 may be similar to step 33 of method 31, except that, in step 43, the polymerization step may include polymerizing a first monomer and a second monomer, wherein the first monomer is an α-olefin monomer comprising a pendant halide and the second monomer is an α-olefin monomer comprising a pendant crosslinker, whereby a first polymer portion is formed, the first polymer portion being a copolymer portion. Steps 45, 47 and 49 may be similar or identical to steps 35, 37, and 39, respectively, of method 31. Alternatively, step 45 may omit the α-olefin monomer comprising the pendant crosslinker. The product formed by method 41 is suitable for use as an anion exchange membrane.

The anion exchange membrane made by any of the processes described above may be used to form a membrane electrode assembly. For example, according to one technique, the anion exchange membrane may be mounted in a peripheral frame, and then catalyst coatings may be applied to the exposed opposed central portions of the anion exchange membrane. Such catalyst coatings may be prepared, for example, by formulating an ink that comprises one or more suitable ionomers and one or more suitable catalysts and then spray-coating, painting or otherwise appropriately applying the ink to the anion exchange membrane. Then, the catalysts may be fused to the anion exchange membrane by hot-pressing. Alternatively, the catalysts may be fused to the anion exchange membrane using the technique disclosed in U.S. patent application Ser. No. 17/743,303, inventors Derek J. Strasser et al., filed May 12, 2022, which is incorporated herein by reference, said technique comprising swelling or plasticizing the anion exchange membrane, preferably at room temperature, with an aqueous ethanol solution vapor and then pressing, preferably at room temperature, the catalyst coatings against the anion exchange membrane to fuse and/or to partially embed the catalysts coating into the anion exchange membrane.

Figure 5:
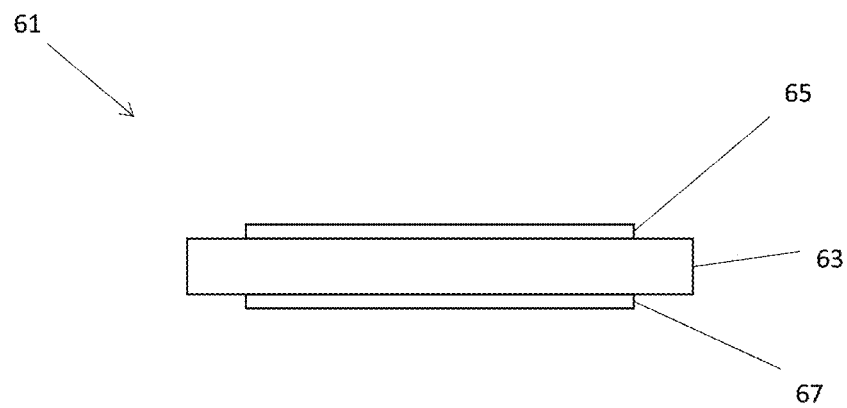
FIG. 5 is a simplified side view of a first embodiment of a membrane electrode assembly constructed according to the present invention.

Referring now to FIG. 5, there is shown a side view of one embodiment of a membrane electrode assembly constructed according to the present invention, the membrane electrode assembly being represented generally by reference numeral 61. Details of membrane electrode assembly 61 that are discussed elsewhere in this application or that are not critical to an understanding of the invention may be omitted from FIG. 5 and/or from the accompanying description herein or may be shown in FIG. 5 and/or described herein in a simplified manner.

Membrane electrode assembly 61 may comprise an anion exchange membrane 63. Anion exchange membrane 63 may be any of the anion exchange membranes discussed herein.

Membrane electrode assembly 61 may further comprise an anode 65 and a cathode 67. Anode 65 and cathode 67 may be in the form of catalyst coatings applied directly to anion exchange membrane 63 by any of the techniques described above. Such catalyst coatings may be conventional catalyst coatings of the type that are commonly applied to anion exchange membranes. For example, and without limitation, a first catalyst coating may be formed by depositing directly onto the membrane an ionomer ink containing a catalyst material suitable for the hydrogen evolution reaction (HER) or the hydrogen oxidation reaction (HOR). More specifically, said catalyst may consist of or comprise one or more platinum group metal (PGM) HER/HOR catalysts (e.g., platinum, palladium, ruthenium, etc.) or may consist of or comprise one or more PGM-free HER/HOR catalysts (e.g., iron, nickel, cobalt, manganese, copper, etc.). The second catalyst coating may be formed by depositing onto the membrane an ionomer ink containing a catalyst material suitable for the oxygen evolution reaction (OER) or the oxygen reduction reaction (ORR). More specifically, said catalyst may consist of or comprise one or more PGM OER/ORR catalysts (e.g., platinum, iridium, ruthenium, or their alloys like PtCo, PtNi, PtFe, PtIr, lrRu, etc.) or may consist of or comprise one or more PGM-free OER/ORR catalysts (e.g., iron, nickel, cobalt, manganese, copper, or one or more oxides of the foregoing metals). For example, where the membrane electrode assembly is to be used in a water electrolyzer with pure water as the feed, the cathode catalyst coating may comprise PtRu/C and/or a PGM-free catalyst, and the anode catalyst coating may comprise iridium oxide and/or a PGM-free catalyst.

The catalyst coatings of the present invention may be formed by conventional techniques. For example, and without limitation, a suitable catalyst may be incorporated into an ionomer ink, and then the catalyst/ionomer ink may be deposited onto an area of the solid polymer electrolyte membrane by spray-coating, painting, or any other suitable deposition technique. During said deposition technique, the solid polymer electrolyte membrane may be held in a frame (which may be made of metal or another suitable material) such that a peripheral portion of the membrane is covered by the frame, with a central (i.e., active) portion of the membrane being exposed for deposition of the catalyst/ionomer inks thereon. After application of the catalyst coatings to the anion exchange membrane, the catalyst coatings are fused to the anion exchange membrane either by hot-pressing or by the swelling and pressing technique of U.S. Ser. No. 17/743, 303.

Figure 6:
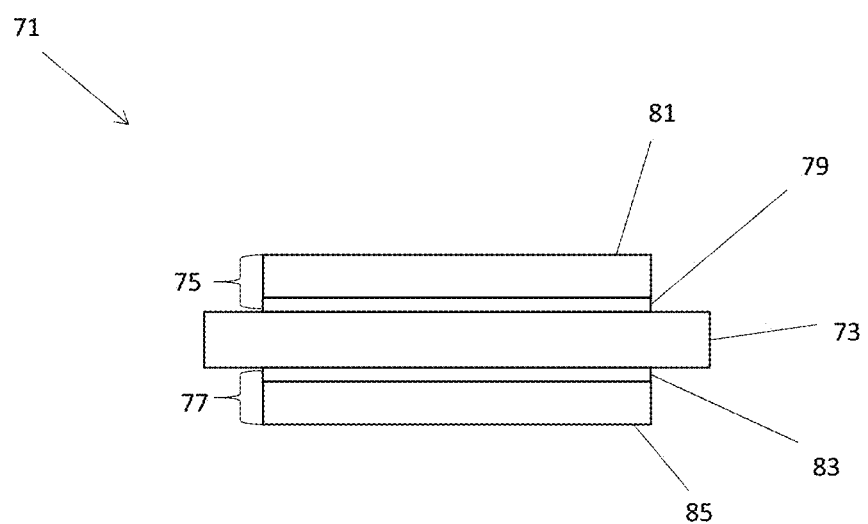
FIG. 6 is a simplified side view of a second embodiment of a membrane electrode assembly constructed according to the present invention.

Alternatively, in another embodiment, the catalyst coatings may be applied to suitable substrates, such as gas diffusion media (e.g., carbon paper), and two such coated substrates may be positioned relative to the anion exchange membrane so that their catalyst coatings directly contact opposing surfaces of the anion exchange membrane. Then, the coated substrates may be fused to the anion exchange membrane either by hot-pressing or by the swelling and pressing technique of U.S. Ser. No. 17/743,303. An example of a membrane electrode assembly of the aforementioned type is shown in FIG. 6 and is represented generally by reference numeral 71. Details of membrane electrode assembly 71 that are discussed elsewhere in this application or that are not critical to an understanding of the invention may be omitted from FIG. 6 and/or from the accompanying description herein or may be shown in FIG. 6 and/or described herein in a simplified manner.

Membrane electrode assembly 71 may comprise an anion exchange membrane 73. Anion exchange membrane 73 may be any of the anion exchange membranes discussed herein.

Membrane electrode assembly 71 may further comprise an anode 75 and a cathode 77. Anode 75 may comprise an anode catalyst 79 and a gas diffusion medium 81, and cathode 77 may comprise a cathode catalyst 83 and a gas diffusion medium 85. Anode catalyst 79 and cathode catalyst 83 may be similar or identical to the catalyst coatings used to make anode 65 and cathode 67, respectively.

In production, anode catalyst 79 may be applied directly to gas diffusion medium 81, and cathode catalyst 83 may be applied directly to gas diffusion medium 85. Then, the combination of anode catalyst 79 and gas diffusion medium 81 may be positioned along one face of anion exchange membrane 73, and the combination of cathode catalyst 83 and gas diffusion medium 85 may be positioned along an opposite face of anion exchange membrane 73. Then, the respective catalysts may be fused to anion exchange membrane 73 by hot-pressing the entire structure or by using the technique of U.S. Ser. No. 17/743,303.

The membrane electrode assemblies of the present invention may be used in various types of electrochemical devices that utilize anion exchange membrane technology including, but not limited to, hydroxide exchange membrane water electrolyzers, hydroxide exchange membrane fuel cells, $CO_2$ electrolyzers, $NH_3$ electrolyzers, and reversible alkaline exchange membrane fuel cells.

The following examples are given for illustrative purposes only and are not meant to be a limitation on the invention described herein or on the claims appended hereto.

Example 1

Figure 7:
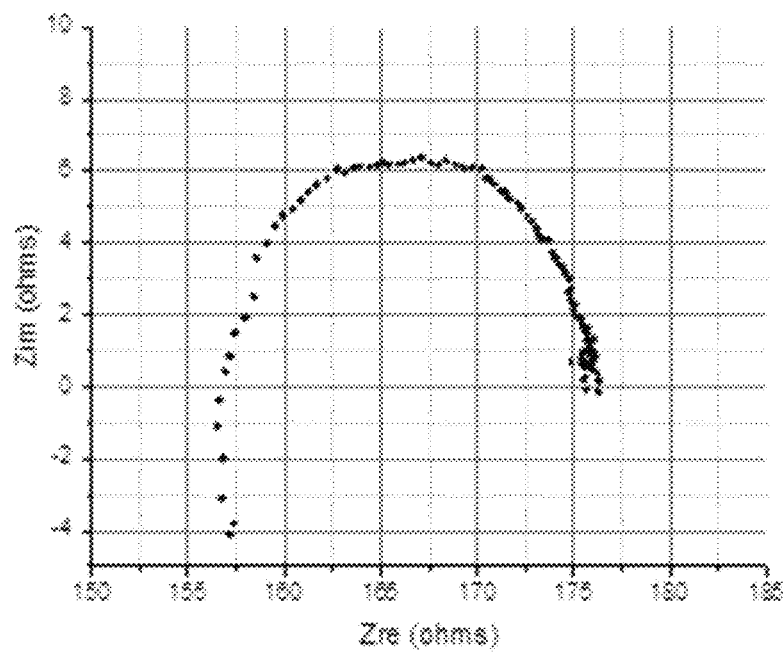
FIG. 7 is a graph depicting electrochemical impedance spectroscopy, obtained at 80° C. in pure water, for an anion exchange membrane, as discussed in Example 1.

The hydroxide conductivity of a terpolymer membrane having 71, 23, and 5 mol % ethylene, 8-(trimethylammonium)-1-octene, and divinylbenzene, respectively, was investigated using the four-point probe in-plane technique. A membrane sample of approximate dimensions cm wide by 2.5 cm long by 0.04 cm thick was evaluated. The membrane sample was first soaked in 3 M potassium hydroxide for at least 2 hours, followed by repeated rinses with 18 MΩ deionized water until the rinse water was neutral. The membrane sample was loaded into a SCRIBNER BT-112 conductivity cell (Scribner Associates Inc., Southern Pines, NC), which was then placed in an 80° C. 18 MΩ/water bath that was continuously degassed with argon. Utilizing a Princeton Applied Research potentiostat (Ametek, Inc., Oak Ridge, TN), electrochemical impedance spectroscopy (EIS) measurements were obtained with frequencies between 1 MHz and 100 Hz and a minimum of 5 repeats to ensure equilibrium of the membrane. The hydroxide conductivity was calculated to be 118 mS/cm from the following formula, where σ is the hydroxide conductivity (mS/cm), d is the distance (cm) between sense and reference electrodes, W is the sample width (cm), T is the sample thickness (cm) and R is the measured resistance obtained from the Nyquist plot (FIG. 7) of the EIS experiments (Q):

$$\sigma = \frac{d}{W \times T \times R}$$

Example 2

Figure 8:
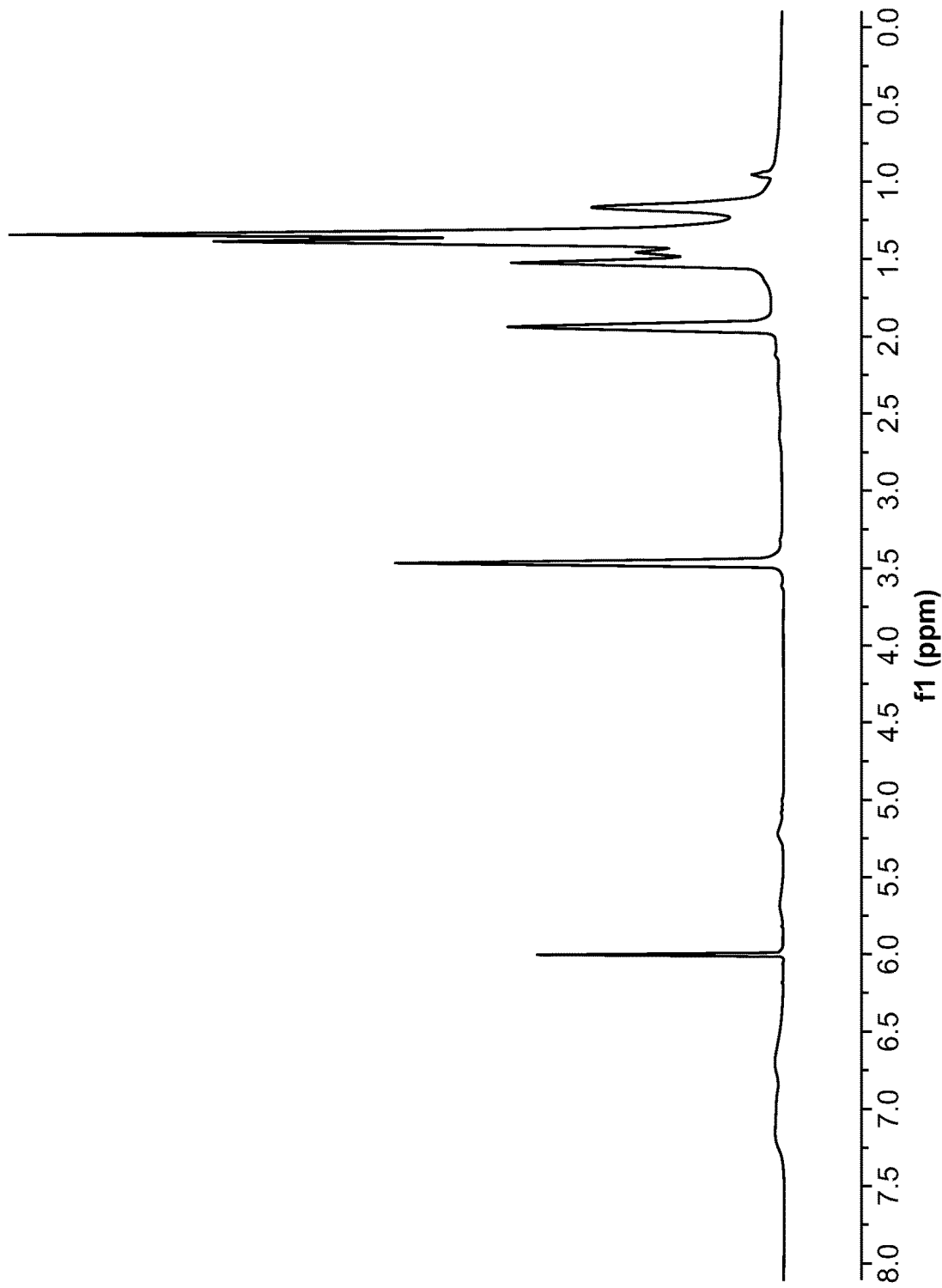
FIG. 8 is a graph depicting the $^1$H NMR spectrum for the membrane as discussed in Example 2, the spectrum indicating the incorporation of 8-bromo-1-octene and divinylbenzene into ethylene polymerization.
Figure 9:
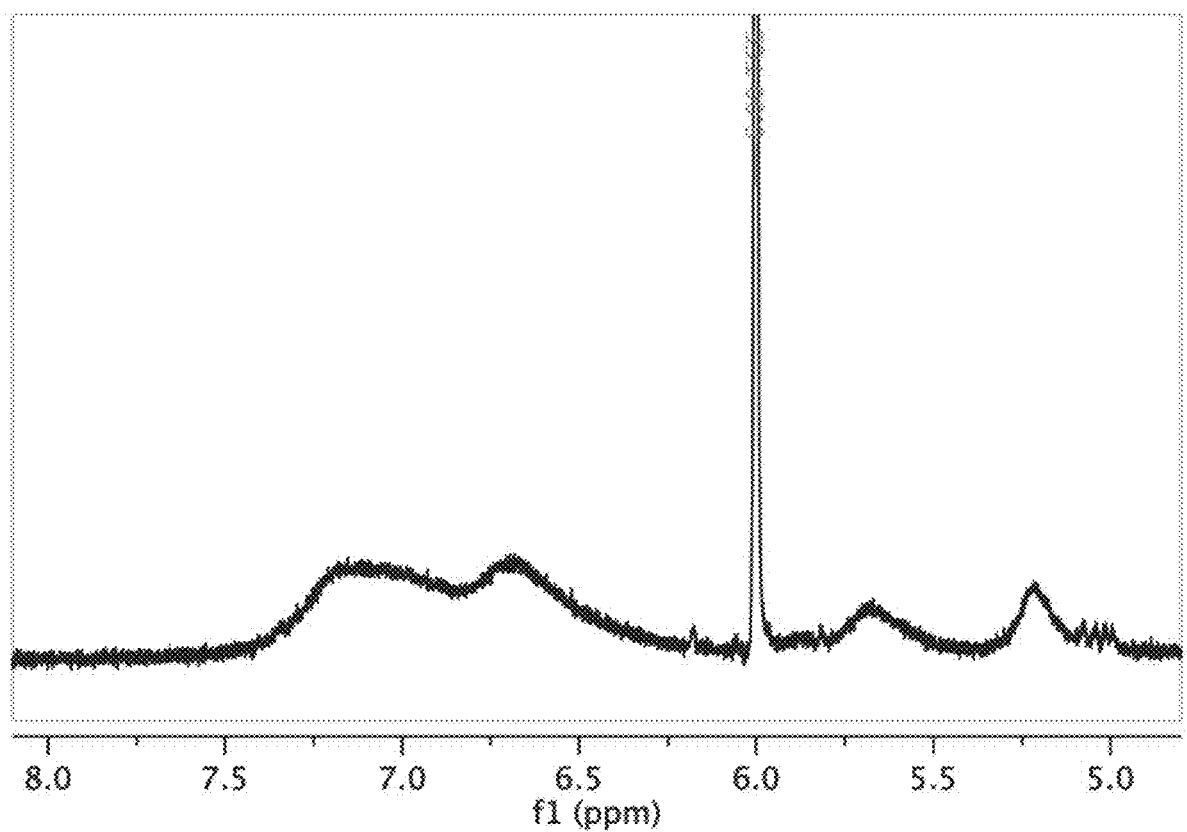
FIG. 9 is an enlargement of a portion of the graph of FIG. 8.

Polymer chemical structure and composition were determined from nuclear magnetic resonance (NMR) spectroscopy. Samples for NMR characterization were prepared with tetrachloroethane-d2 NMR solvent with ~1.5% wt. polymer. The solution was horn sonicated until homogeneous. Proton NMR spectra (see FIGS. 8 and 9) were obtained on a Varian 500 MHz instrument at 100° C. at Boston University. The free induction decay (FID) obtained from the NMR experiment was processed and analyzed with MestReNova NMR software.

Example 3

The ion exchange capacity (IEC) of the copolymer and terpolymer examples described below in TABLE 1 was evaluated by integration of the $^1H$ NMR signals and by titration. Evaluation of the IEC by $^1H$ NMR was completed by calculation of the mol % of each component of the polymer through integration of unique signals associated with the protons α to the functional pendant and the aromatic protons associated with the aromatic ring. From the determined composition, the IEC was calculated assuming hydroxide is the counterion. Evaluation of the IEC by titration was completed by soaking the membrane in 3 M KOH for at least 2 hours and washing with deionized water until the washings were neutral. A known quantity of excess HCl was then added to the membrane solution, and the membrane was allowed to soak overnight. Following the overnight soak, the excess HCl was titrated with a sodium hydroxide solution of known concentration. The difference between the amount of HCl added and the amount consumed by titration is the mmol of present functional groups. The mmol of present functional groups was divided by the membrane dry mass resulting in the titrated IEC.

TABLE 1

| Membrane Sample | Composition [mol %] | | | Theoretical IEC [mmol/g] ($^1H$ NMR Evaluation) | IEC [mmol/g] (Titration evaluation) |
| --- | --- | --- | --- | --- | --- |
| | Ethylene | 8-(N,N,N-trimethyl-ammonium)-1-octene | Divinyl-benzene | | |
| Copolymer | 51 | 49 | 0 | 4.6 | 2.9 |
| Terpolymer | 71 | 23 | 5 | 3.3 | 2.1 |

Additional aspects, features, advantages, and comments regarding the invention include the following:

The present invention may use relatively inexpensive materials like ethylene as a co-monomer to form the polymer backbone and may be used to make polymer backbones that lack any heteroatoms. This is in contrast with many types of anion exchange membranes, which use aromatic monomers to form the polymer backbone.

The present invention may employ Ziegler-Natta polymerization, which is an inexpensive and well-characterized polymerization technique.

The present invention may provide considerable variability in the composition of the anion exchange membranes that are produced. For example, where a two-step polymerization technique is employed, one may control the length of the first and second polymer portions, for example, by controlling the duration of the polymerization steps. In addition, one may control the composition of the first and second polymer portions by controlling the proportions of the various monomers involved in the polymerization.

The two-step polymerization process may help to ensure a desirable level of incorporation of the halide-containing monomer into the polymer. In other words, if the polymerization were a one-step polymerization, the non-functionalized monomer (e.g., ethylene) would predominate in the polymer.

The present invention may provide a relatively simple way to make functionalized polyolefins.

The present invention may be used to prepare anion exchange membranes that are able to be thermally processed to form membrane electrode assemblies.

The inclusion of a crosslinker in some embodiments of the polymer may be advantageous in providing additional strength or rigidity to the polymer through crosslinking.

The non-functionalized monomer, such as ethylene, may be used to provide mechanical strength to the polymer whereas the halogen-containing monomer, such as 8-bromo-1-octene, may be used to provide a handle for the cationic group used in anion exchange.

Where no crosslinking monomer is used, the polymer has only the halide-containing monomer in the first polymer portion and may have a kind of gradient or block-like composition.

The present invention may be used to provide a unique architecture to the anion exchange membrane. More specifically, by providing a first polymer portion that is predominantly or exclusively made up of the halogen-containing monomer (which, when functionalized, will become the cation-containing monomer) and by providing a second polymer portion that is predominantly made up of the non-functionalized olefin monomer (such as ethylene), the resulting polymer tends to have nanosize domains that phase separate from one another when the polymer is processed into an anion exchange membrane. The presence of such phase-separated nanosize domains may be advantageous as they may promote anion conductivity through the cation-containing domains. In other words, the cation-containing domains may provide a channel of anion conductivity through the membrane.

The present invention may be used to make AEM membrane electrode assemblies capable of maintaining high performance for extended periods of time.

The present invention permits the use of comparatively low molecular weight monomers that enable a larger range of IEC (ion exchange capacity) than current technology. Also, bulk material phase allows for thermal processing. Additionally, polymer materials may be generated by well-established catalytic methods. Moreover, enabling hot-press capability may lead to easier membrane electrode assembly fabrication and dry-build stacks. Also, cross-linking, where applicable, permits further water management control. Furthermore, the use of a pendant halogen, where applicable, enables a variety of functional group incorporation. Lastly, the present technique is inexpensive to perform.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. An anion exchange membrane, the anion exchange membrane comprising a copolymer, the copolymer comprising first monomer units and second monomer units, wherein each of the first monomer units comprises an α-octene monomer unit containing a pendant ammonium group, and wherein each of the second monomer units comprises an ethylene monomer unit.

2. An anion exchange membrane, the anion exchange membrane comprising a copolymer, the copolymer comprising first monomer units and second monomer units, wherein each of the first monomer units comprises an α-octene monomer unit containing a pendant ammonium group, and wherein each of the second monomer units comprises a non-functionalized α-olefin monomer unit.

3. The anion exchange membrane as claimed in claim 2, wherein the non-functionalized α-olefin monomer unit is selected from the group consisting of an ethylene monomer unit, a propylene monomer unit, a butylene monomer unit, and a 3-methyl-1-pentene monomer unit.

4. The anion exchange membrane as claimed in claim 3, wherein the non-functionalized α-olefin monomer unit is a propylene monomer unit.

5. The anion exchange membrane as claimed in claim 2, wherein the α-octene monomer unit containing a pendant ammonium group is an 8-halo-1-octene monomer unit containing a pendant ammonium group.

6. The anion exchange membrane as claimed in claim 5, wherein the 8-halo-1-octene monomer unit containing a pendant ammonium group is selected from an 8-bromo-1-octene monomer unit containing a pendant ammonium group and an 8-chloro-1-octene monomer unit containing a pendant ammonium group.

7. The anion exchange membrane as claimed in claim 5, wherein the 8-halo-1-octene monomer unit containing a pendant ammonium group is an 8-bromo-1-octene monomer unit containing a pendant ammonium group.

8. The anion exchange membrane as claimed in claim 2, wherein the α-octene monomer unit containing a pendant ammonium group constitutes about 10% to about 50% of the copolymer.

9. The anion exchange membrane as claimed in claim 8, wherein the α-octene monomer unit containing a pendant ammonium group constitutes about 10% to about 15% of the copolymer.

10. The anion exchange membrane as claimed in claim 2, wherein the pendant ammonium group is selected from the group consisting of trimethylammonium, N-methyl-piperidinium, N-methyl-pyrrolidinium, 1-methylimidazolium, and 1,2-methylimidazolium.

11. The anion exchange membrane as claimed in claim 10, wherein the pendant ammonium group is trimethylammonium.

* * * * *